United States Patent [19]

Taylor et al.

[11] Patent Number: 5,058,256

[45] Date of Patent: Oct. 22, 1991

[54] BEARING CARRIER PULLER TOOL

[76] Inventors: Bud Taylor, P.O. Box 716, Boulder City, Nev. 89005; Thomas J. Edelman, 4310 Verona Ave., Las Vegas, Nev. 89120

[21] Appl. No.: 663,364

[22] Filed: Feb. 28, 1991

[51] Int. Cl.[5] .............. B23P 19/04

[52] U.S. Cl. .............. 29/260

[58] Field of Search .............. 29/256, 258, 259, 260, 29/263, 264

[56] References Cited

U.S. PATENT DOCUMENTS

| | | | |
|---|---|---|---|
| 1,431,378 | 10/1922 | Derry | 29/259 |
| 1,865,420 | 6/1932 | Kick . | |
| 3,846,898 | 11/1974 | Ken | 29/259 |
| 4,011,648 | 3/1977 | Martinson et al. . | |
| 4,031,603 | 6/1977 | Shultz . | |
| 4,398,706 | 8/1983 | Kaulfuss | 29/261 |
| 4,583,275 | 4/1986 | Diaz . | |
| 4,663,814 | 5/1987 | Beck . | |
| 4,896,412 | 1/1990 | Meisner et al. . | |
| 4,908,925 | 3/1990 | Johnson | 29/260 |

OTHER PUBLICATIONS

Mercury Marine maintenance manual, pp. 3B-6, 3B-7, 3C-7, 3C-8, 6A-4, 6A-5 and 6A-10.

Page 403 from an unidentified source.

Outboard Marine Corporation maintenance manual, p. 8-5.

*Primary Examiner*—Robert C. Watson

*Attorney, Agent, or Firm*—Quirk, Tratos & Roethel

[57] ABSTRACT

A bearing carrier puller tool has a central cylindrical body member that receives a threaded puller bolt. Disposed on each side of the central body member is a mounting member that receives a puller arm threaded therein. Each puller arm has a foot portion designed to interact with an area on the bearing carrier. In one version, the foot portion is generally square and sized so that the foot portion will pass through the space between the spokes on the bearing carrier. The upper end of the foot portion is wedged into contact with the underside of a flat ridge on the bearing carrier to securely hold the foot and thus the puller arm in contact with the bearing carrier. In another version, each puller arm has a J-shaped foot portion that hooks under a spoke on the bearing carrier to securely hold the foot portion and thus the puller arm in contact with the bearing carrier. The puller bolt is designed to act on the end of the propeller drive shaft and the puller bolt has a polygonal end section so that a wench can be applied to the puller bolt to cause rotation of the puller bolt. When the puller bolt is rotated, force is applied to the end of the propeller drive shaft and the central body member rotates about the threaded bolt. This causes the puller arms to pull on the bearing carrier and withdraw the bearing carrier from the housing.

3 Claims, 7 Drawing Sheets

BEARING CARRIER PULLER TOOL

This invention relates to a puller tool, and more particularly to a puller tool used to remove a bearing carrier from the case of the lower unit housing on a marine engine.

BACKGROUND OF THE INVENTION

Marine engines have a drive shaft that turns the propeller. The end of the propeller drive shaft remote from the propeller is connected to the gear assembly that effects the rotation of the propeller drive shaft. The gear assembly and propeller drive shaft are contained within a housing. In order to position the propeller drive shaft in the center of the housing, a bearing carrier is press fit into the housing that surrounds the propeller drive shaft.

In the event of gear assembly damage or in the event that routine maintenance is needed, it is necessary to remove the bearing carrier from the housing. This allows access to the gear assembly inside the housing for repair or maintenance.

Because the bearing carrier is tightly press fit into the housing, it is not possible to remove the bearing carrier by hand; a tool must be used to pull the bearing carrier out of the housing. It is desirable to remove the bearing carrier without damaging it so that the bearing carrier may be reused to center the propeller drive shaft when the gear assembly is reassembled inside the housing. Bearing carriers are quite expensive, costing as much as $200.00 and up. Breaking or destruction of the bearing carrier during maintenance or repair of the gear assembly is an unnecessary expense that the boat owner does not like to incur.

The bearing carrier has a central hollow shaft through which is disposed the propeller drive shaft. The bearing carrier also has an outer ring member that positions the bearing carrier in the center of the housing. A plurality of radially extending spokes connect the outer ring member to the central hollow shaft. If force is applied to the outer ring member to remove the bearing carrier from the housing, the outer ring member is prone to break off from the central shaft and the spokes. The design of the outer ring member portion of the bearing carrier will not accommodate the pulling force necessary to overcome the press fit of the bearing carrier in the housing.

One type of tool to pull the bearing carrier from the gear housing has been distributed by Mercury Marine, a division of the Brunswick Corporation, Fond du Lac, Wis. The tool utilizes a pair of puller jaws (Mercury Model No. C-91-46086A1) along with a puller bolt (Mercury Model No. C-91-85716). Each puller jaw has a J-shaped foot that hooks around the underside of the outer ring of the bearing carrier. The puller bolt is positioned against the end of the propeller drive shaft and as the puller bolt is turned down against the propeller drive shaft, the puller jaws move the bearing carrier in a direction opposite to the direct of the force of the puller bolt, thereby removing the bearing carrier from the housing.

The Mercury Marine tool has the disadvantage that each of the feet on the end of the puller jaws turn outward and hook under the outer ring on the bearing carrier. Thus all of the pulling force of each puller jaw is transmitted onto the outer ring of the bearing carrier. It is quite easy for the puller jaws to slip off these bosses thereby preventing removal of the bearing carrier from the housing. It is also quite easy for the outer ring to break away from the body of the bearing carrier thereby preventing reuse of the bearing carrier. In fact, the repair manual distributed by Mercury Marine cautions against using the puller tool by pulling on the bearing carrier outer ring, but the repair manual does not indicate where the puller tool's jaws are supposed to be positioned if they are not positioned on the outer ring of the bearing carrier.

Another type of tool used to pull bearing carrier from the housing is distributed by Outboard Marine Corporation of Waukegan, Ill. This tool is designed for the bearing carriers used in the marine engines made by Outboard Marine Corporation. This tool utilizes a pair of J-shaped feet that dangle loosely from a mounting bracket that is designed to go on the end of a drive shaft. Another version of the puller tool made by Outboard Marine Corporation has legs that screw into threaded apertures on the bearing carrier itself. Both of these tools require the mechanic to use both of his hands simultaneously to remove the bearing carrier.

It is an object of the present invention to provide an improved bearing carrier puller tool that transmits the pulling force directly onto the spokes connecting the outer ring to the central hollow shaft and not onto the outer ring itself.

It is a feature of the present invention to provide a specially designed foot on the end of the puller jaw so that orientation of the foot in the space between the outer ring and the central hollow shaft of the bearing carrier will secure the foot to the bearing carrier so that when the pulling force is applied to the tool the bearing carrier will easily and effectively removed from the housing.

It is an advantage of the present invention that the puller tool will remove the bearing carrier from the housing efficiently and quickly and the risk of premature separation of the puller tool from the bearing carrier will be eliminated as well as the risk of breaking of the bearing carrier due to the separation of the outer ring from the bearing carrier.

SUMMARY OF THE INVENTION

A bearing carrier puller tool has a central cylindrical body member that receives a threaded puller bolt. Diametrically disposed on each side of the central body member is an arm mounting member that receives a puller arm threaded therein. Each puller arm has a foot portion designed to interact with the spoke area on the bearing carrier.

In one version specifically designed to be used on the bearing carrier used in Mercury Marine marine engines, the foot portion is generally square in cross section and sized so that the foot portion will pass through the space between the spokes on the bearing carrier. The upper end of the foot portion is then wedged into contact with the underside of a flat ridge on the central hollow body to securely hold the foot and thus the puller arm in contact with the bearing carrier.

In another version of the puller tool of the present invention specifically designed to be used on the bearing carrier used in Outboard Marine Corporation marine engines, each puller arm has a J-shaped foot portion that hooks under the spokes to securely hold the foot portion and thus the puller arm in contact with the bearing carrier.

One end of the puller bolt is designed to act on the end of the propeller drive shaft and the other end of the puller bolt has a polygonal cross section so that a wrench can be applied to the puller bolt to cause rotation of the puller bolt. When the puller bolt is rotated, force is applied to the end of the propeller drive shaft and the central body member rotates about the threaded bolt. This causes the puller arms to pull on the bearing carrier and withdraw the bearing carrier from the housing.

DETAILED DESCRIPTION OF THE PREFERRED EMBODIMENTS

Figure 1:
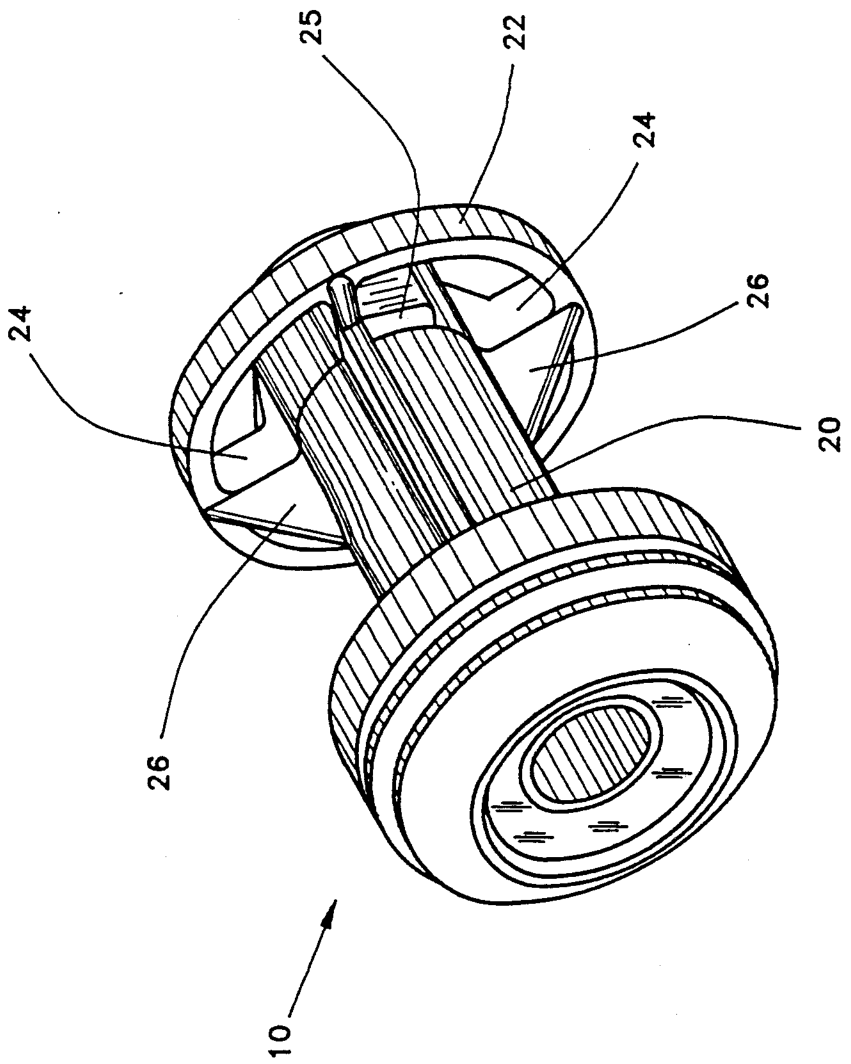
FIG. 1 shows a perspective view of a bearing carrier used by Mercury Marine in its marine engines and used in connection with the bearing carrier puller tool of the present invention.

A bearing carrier that is to be removed from the housing surrounding a propeller drive shaft in a marine sterndrive or outboard engine is shown generally at 10 in FIG. 1. This particular bearing carrier is of the type used by Mercury Marine in its marine engines.

Both the bearing carrier 10 and the propeller drive shaft 12 (shown in phantom in FIG. 3) are positioned inside a housing (not shown) on a marine sterndrive or outboard engine. The bearing carrier 10 is press fit into the housing to hold the bearing carrier securely inside the housing so that the propeller drive shaft 12 is positioned appropriately to receive a propeller (not shown) on one end thereof.

The bearing carrier 10 is a generally cylindrical body that has a central hollow shaft 20 through which is disposed the propeller drive shaft 12. An outer ring member 22 is attached by means of a plurality of radially disposed spokes 24 to the central hollow shaft 20. The outer circular surface of the outer ring member 22 is the surface that engages the interior of the housing in the press fit relationship to securely hold the bearing carrier in the housing. Each spoke 24 has associated therewith a support flange 26 attaching the spoke 24 to the central hollow shaft 20 and adding additional strength to the outer ring member 22. The support flange 26 coincides with the underside of each spoke 24 and eliminates using the underside of the spoke 24 as a gripping or attachment surface for any pulling tool that might be used on the bearing carrier 10.

As shown in FIG. 1, the Mercury Marine bearing carrier 10 does have a small flat ridge 25 that extends outward from the central hollow shaft 20. This flat ridge 25 is integrally formed with the central hollow shaft. In fact, there are two of such flat ridges 25 on diametrically opposed sides of the central hollow shaft 20.

When it is time to perform routine maintenance on the gear assembly which also mounted inside the housing or if the gear assembly has been damaged and is in need of repair, it is necessary to remove the bearing carrier 10 from the housing so that the gear assembly is accessible. If the bearing carrier 10 is damaged during removal, then the bearing carrier cannot be reused and the owner of the marine engine will be subjected to the additional expense of replacing the bearing carrier.

Because of the construction of the bearing carrier 10 and because of the tightness of the press fit of the bearing carrier 10 inside the housing, if force is applied by pulling directly on the outer ring member 22 in attempt to remove the bearing carrier 10 from the housing, there is a high probability that the outer ring member 22 will simply break away from the central hollow shaft 20 of the bearing carrier 10.

Figure 2:
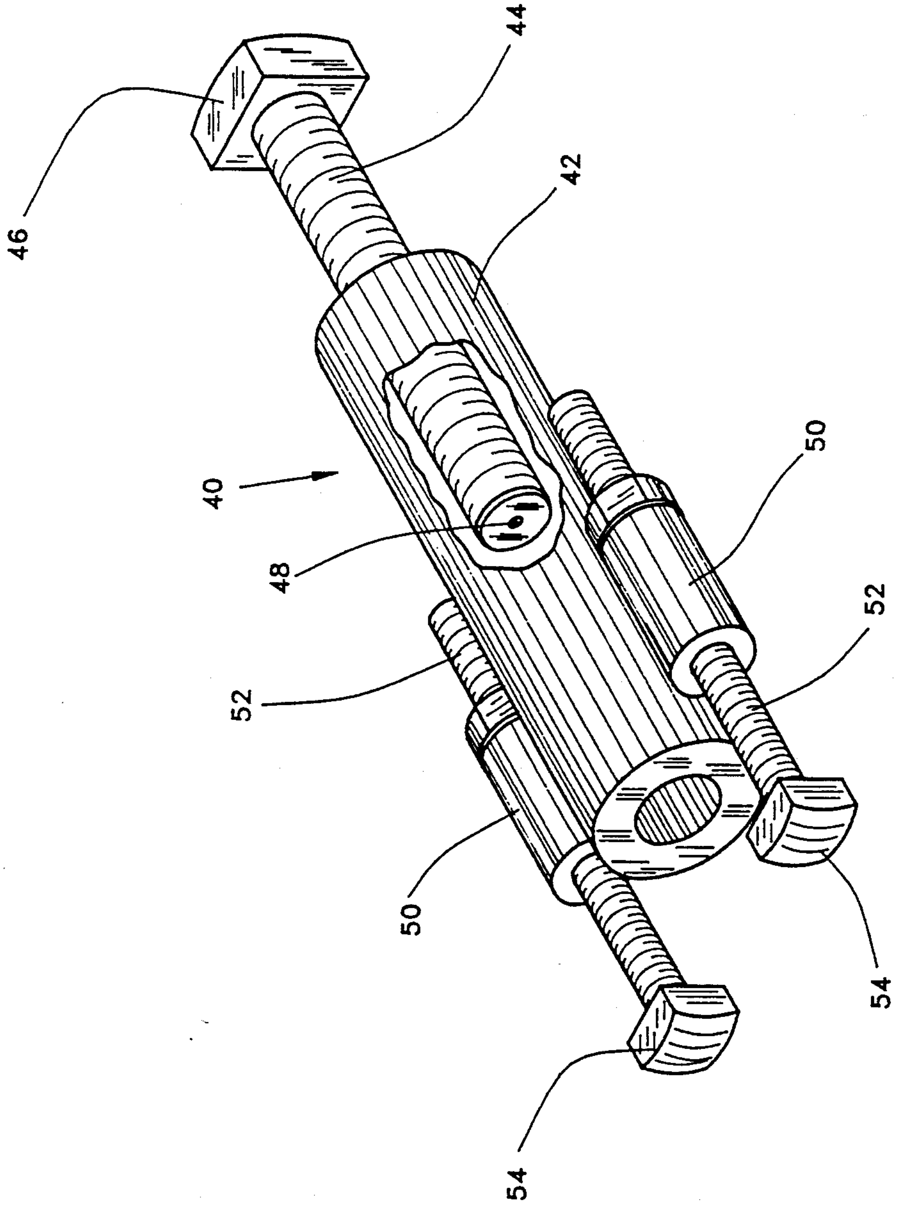
FIG. 2 shows a perspective view of a preferred embodiment of the bearing carrier puller tool of the present invention.

FIG. 2 shows the bearing carrier puller tool 40 of the present invention that is used to remove the bearing carrier 10 from the housing in which the bearing carrier is press fit. The bearing carrier puller tool 40 shown in FIG. 2 is particularly designed to be used on the bearing carrier 10 used in by Mercury Marine in its marine engines.

The bearing carrier puller tool 40 has a central body member 42 which is a generally cylindrical hollow body having a central threaded cavity running the entire length thereof. A threaded puller bolt 44 is threadably received in the central threaded cavity.

One end of the threaded puller bolt 44 is provided with a bolt head 46 which is preferably polygonal shaped in cross section so that a wrench or other suitable equipment can be applied to the bolt head 46 to cause rotation of the threaded puller bolt 44 relative to the central body member 42. The other end of the threaded puller bolt 44 is designed to engage the end of the propeller drive shaft 12 and, in the preferred embodiment of the present invention, this other end of the threaded puller bolt 44 is provided with a recess 48 which receives the end of the propeller drive shaft 12 to position the threaded puller bolt 44 relative to the end of the propeller drive shaft 12.

Figure 3:
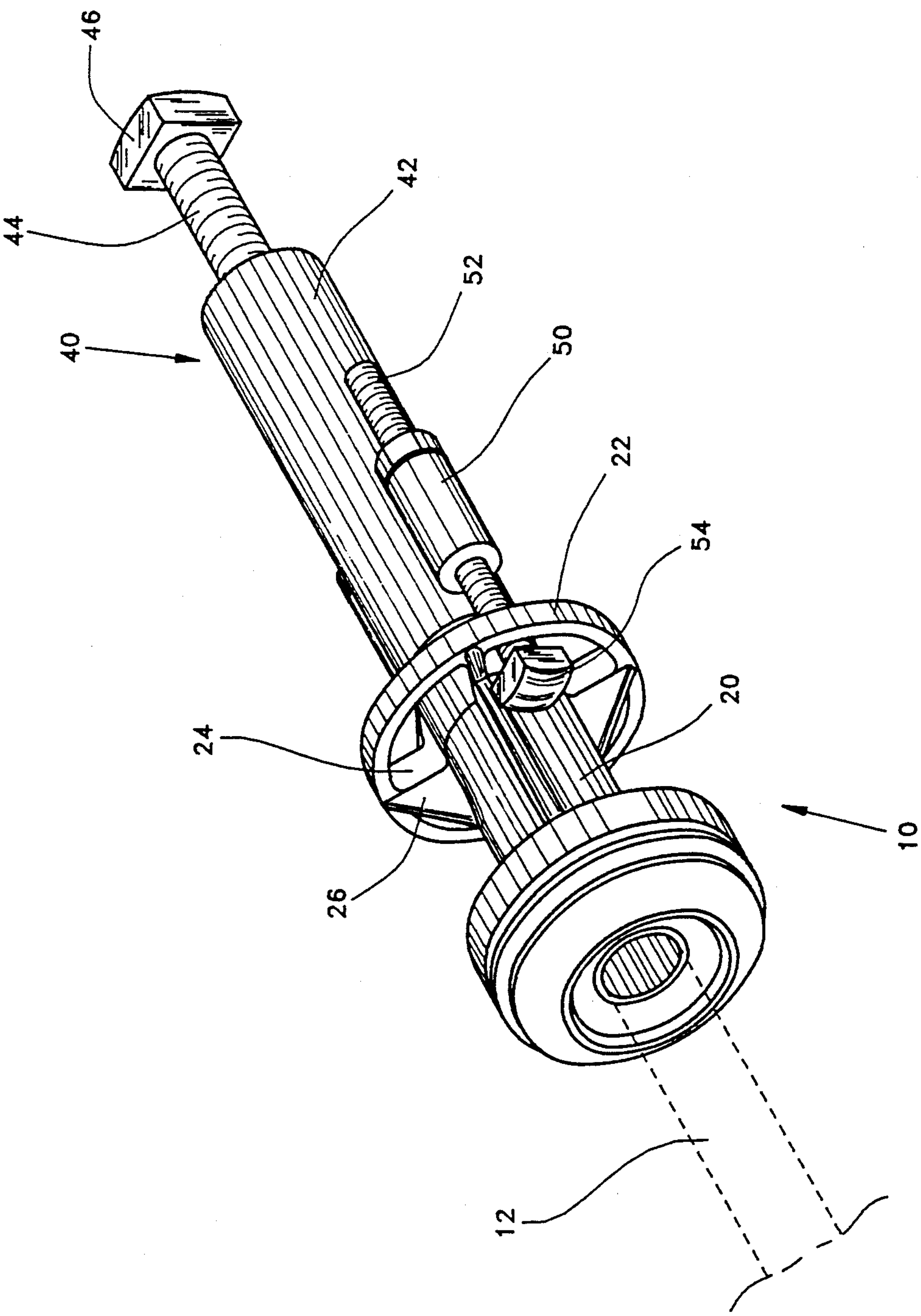
FIG. 3 shows a perspective view of the bearing carrier puller tool of the present invention mounted in operative engagement with the Mercury Marine bearing carrier.
Figure 4:
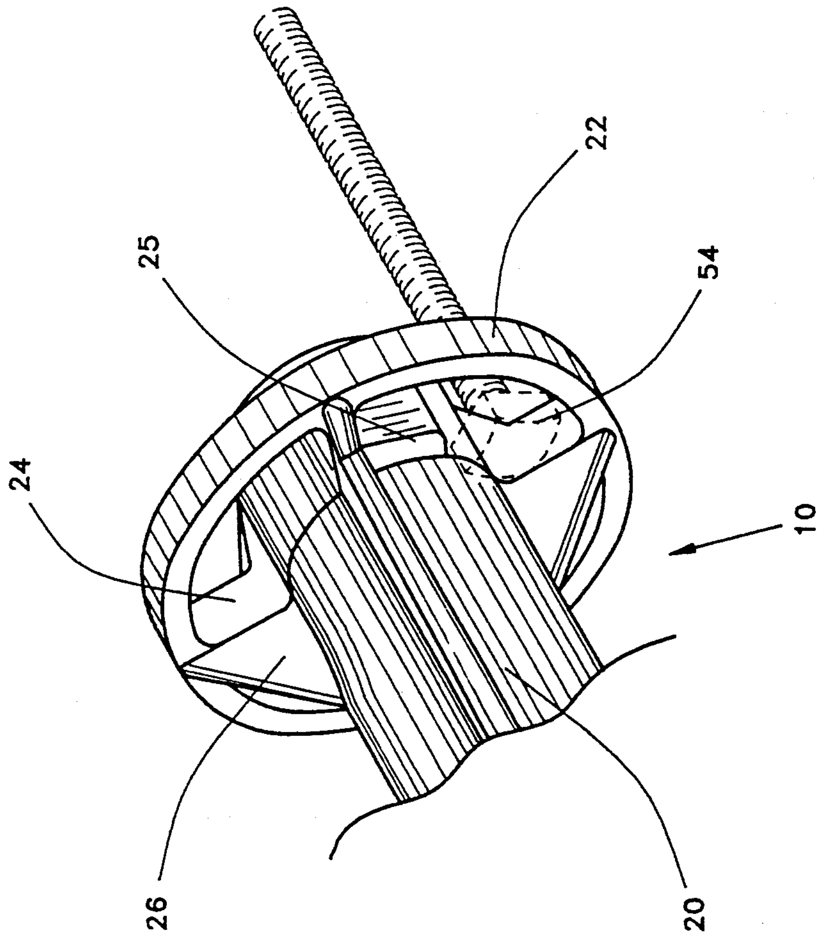
FIG. 4 shows a perspective view partly in phantom of the bearing carrier puller tool of the present invention mounted in engagement with the Mercury Marine bearing carrier.

Mounted to each side of the bearing carrier puller tool 40 is an arm mounting member 50. The attachment of the arm mounting member 50 can be by welding or other appropriate attachment method. Each arm mounting member 50 is a generally cylindrical body having a hollow threaded interior adapted to receive a threaded arm 52. One end of each threaded arm 52 is provided with a square foot portion 54. The size of the square foot portion 54 is selected so that the square foot portion 54 just fits into the open space between the outer ring member 22 and the central hollow shaft 20 as shown in FIGS. 3 and 4.

In order to mount the bearing carrier puller tool 40 in operative relationship with the bearing carrier 10, the end of the propeller drive shaft 12 fits into the recess 48 on the end of the bearing carrier puller tool 40 to position the bearing carrier puller tool 40 relative to the propeller drive shaft 12. Each threaded arm 52 is rotated in the arm mounting member 50 so that the square foot portion 54 is extended into position relative to the central hollow shaft 20. Due to the sizing of the square foot portion 54, it passes through the space between the outer ring member 22 and the central hollow shaft 20 as shown in FIG. 4. Once the square foot portion 54 passes under the edge of the outer ring member 22, a slight axial rotation of the bearing carrier puller tool 40 will cause each square foot portion 54 to hook underneath one of the flat ridges 25 adjacent the central hollow shaft 20 as shown in FIG. 3. Each threaded arm 52 can then be rotated in an opposite direction to secure the square foot portion 54 against the underside of the flat ridge 25.

In order to remove the bearing carrier 10 from the surrounding housing in which the bearing carrier 10 is press fit, the threaded puller bolt 44 is turned by applying force with a wrench or other appropriate equipment to the bolt head 46. Because the end of the threaded puller bolt 44 remote from the bolt head 46 is pushing on the end of the propeller drive shaft 12, the central body member 42 will rotate up the threaded puller bolt 44 and move away from the propeller drive shaft 12. Each arm mounting member 50 along with the attached threaded arm 52 and square foot portion 54 will move with the central body member 42, causing the bearing carrier 10 to move along the length of the propeller drive shaft 12 and be pulled from the housing. The force applied to the bearing carrier 10 is applied only to the flat ridges 25 and thus the outer ring member 22 will not break away from the central hollow shaft 20. This leaves the bearing carrier 10 intact from reuse once maintenance or repair to the gear assembly has been completed.

Figure 5:
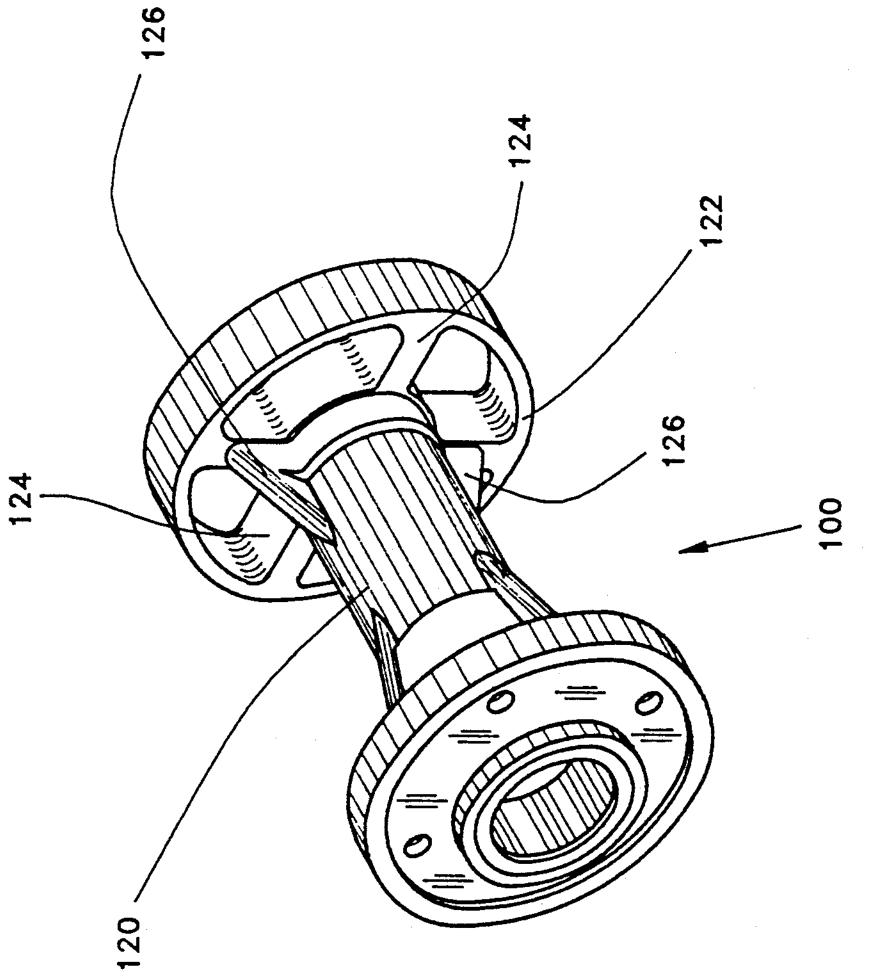
FIG. 5 shows a perspective view of a bearing carrier used by Outboard Marine Corporation in its marine engines and used in connection with another bearing carrier puller tool of the present invention.
Figure 6:
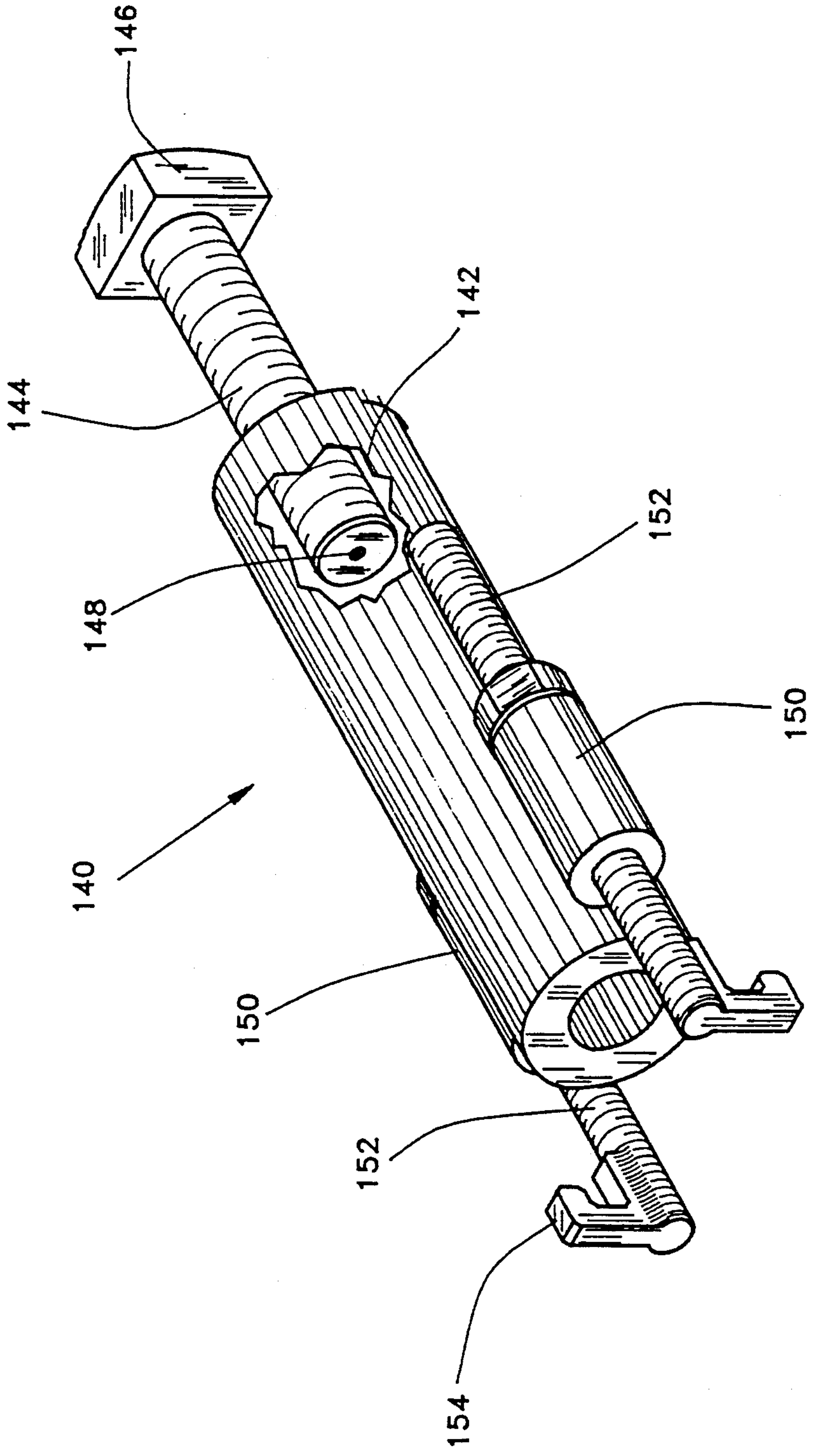
FIG. 6 shows a perspective view of an alternative preferred embodiment of the bearing carrier puller tool of the present invention.
Figure 7:
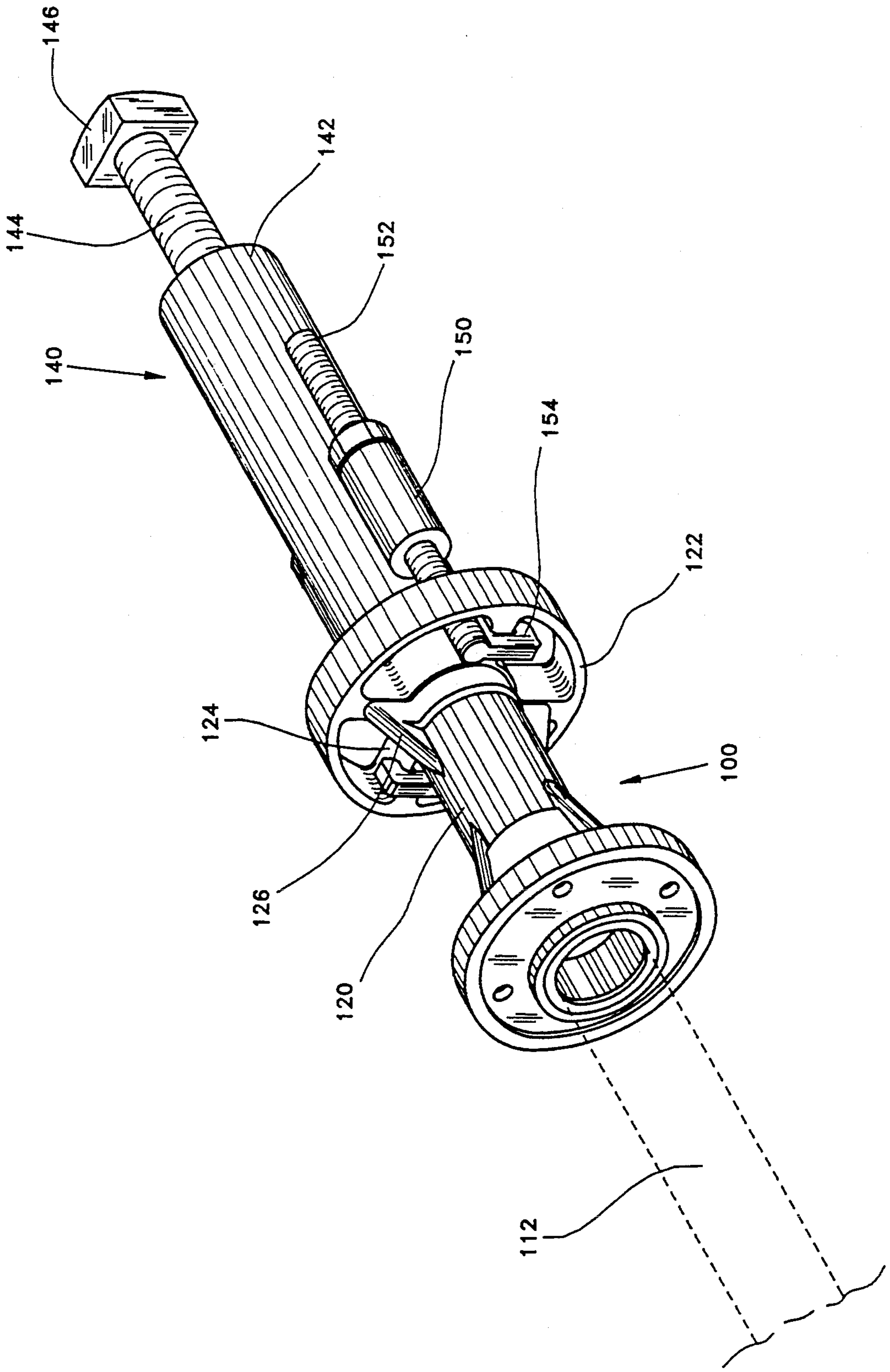
FIG 7 shows a perspective view, of the alternate embodiment of the bearing carrier puller tool of the present invention mounted in operative engagement with the bearing carrier used by Outboard Marine Corporation.

An alternative embodiment of the present invention is shown in FIGS. 5, 6 and 7. A bearing carrier of the type used by Outboard Marine Corporation in its maxine engines is shown generally at 100 in FIG. 5. The bearing carrier 100 is a generally cylindrical body that has a central hollow shaft 120 through which is disposed the propeller drive shaft. An outer ring member 122 is attached by means of a plurality of radially disposed spokes 124 to the central hollow shaft 120. The outer circular surface of the outer ring member 122 is the surface that engages the interior of the housing in the press fit relationship to securely hold the bearing carrier in the housing. Two of the spokes 124 have associated therewith a support flange 126 attaching the spoke 124 to the central hollow shaft 120 and adding additional strength to the outer ring member 122. The support flange 126 coincides with the underside of each spoke 124 and eliminates using the underside of the spoke 124 as a gripping or attachment surface for any pulling tool that might be used on the bearing carrier 100. The other two spokes 124, however, do not have a corresponding support flange 126 and may be used to attach a puller tool for removing the bearing carrier 100 from the housing.

FIG. 6 shows the bearing carrier puller tool 140 of the alternative embodiment that is used to remove the Outboard Marine Corporation bearing carrier 100 from the housing in which the bearing carrier is press fit. The bearing carrier puller tool 140 has a central body member 142 which is a generally cylindrical hollow body having a central threaded cavity running the entire length thereof. A threaded puller bolt 144 is threadably received in the central threaded cavity.

One end of the threaded puller bolt 144 is provided with a bolt head 146 which is preferably polygonal shaped in cross section so that a wrench or other suitable equipment can be applied to the bolt head 146 to cause rotation of the threaded puller bolt 144 relative to the central body member 142. The other end of the threaded puller bolt 144 is designed to engage the end of the propeller drive shaft 112 and, in the preferred embodiment of the present invention, this other end of the threaded puller bolt 144 is provided with a recess 148 which receives the end of the propeller drive shaft 112 to position the threaded puller bolt 144 relative to the end of the propeller drive shaft 112.

Mounted to each side of the bearing carrier puller tool 140 is an arm mounting member 150. The attachment of the arm mounting member 10 can be by welding or other appropriate attachment method. Each arm mounting member 150 is a generally cylindrical body having a hollow threaded interior adapted to receive a threaded arm 152. One end of each threaded arm 152 is provided with a J-shaped foot portion 154. The size of the J-shaped foot portion 154 is selected so that the J-shaped foot portion 154 just fits into the open space between the outer ring member 122 and the central hollow shaft 120 as shown in FIG. 5.

In order to mount the bearing carrier puller tool 140 in operative relationship with the bearing carrier 100, the end of the propeller drive shaft 112 fits into the recess 148 on the end of the bearing carrier puller tool 140 to position the bearing carrier puller tool 140 relative to the propeller drive shaft 112. Each threaded arm 152 is rotated in the arm mounting member 150 so that the J-shaped foot portion 154 is extended into position relative to the central hollow shaft 120. Due to the sizing of the J-shaped foot portion 154, it passes through the space between the outer ring member 122 and the central hollow shaft 120. Once the J-shaped foot portion 154 passes under the edge of the outer ring member 122, a slight axial rotation of the bearing carrier puller tool 140 will cause each J-shaped foot portion 154 to hook underneath one of the spokes 124 connecting the outer ring member 122 with the central hollow shaft 120. Each threaded arm 152 can then be rotated in an opposite direction to secure the J-shaped foot portion 154 against the underside of the spoke 124. In the preferred embodiment of the invention, the J-shaped foot portions 154 are oriented in opposite directions relative to each other as shown in FIGS. 6 and 7 in order to balance the pulling forces applied to the bearing carrier 100.

In order to remove the bearing carrier 100 from the surrounding housing in which the bearing carrier 100 is press fit, the threaded puller bolt 144 is turned by applying force with a wrench or other appropriate equipment to the bolt head 146. Because the end of the threaded puller bolt 144 remote from the bolt head 146 is pushing on the end of the propeller drive shaft 112, the central body member 142 will rotate up the threaded puller bolt 144 and move away from the propeller drive shaft 112. Each arm mounting member 150 along with the attached threaded arm 152 and J-shaped foot portion 154 will move with the central body member 142, causing the bearing carrier 100 to move along the length of the propeller drive shaft 112 and be pulled from the housing. The force applied to the bearing carrier 100 is applied only to the spokes 124 and thus the outer ring member 122 will not break away from the central hollow shaft 120. This leaves the bearing carrier 100 intact from reuse once maintenance or repair to the gear assembly has been completed.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

What is claimed is:

1. A bearing carrier puller tool comprising:

a) a generally cylindrical central body member having a threaded interior cavity, b) a puller bolt threadably received in the interior cavity of the central body member, c) at least a pair of arm mounting members attached to the central body member on diametrically opposed sides thereof, d) each arm mounting member having a threaded interior cavity and a puller arm threadably received in the interior cavity thereof, e) each puller arm having a foot portion on one end thereof, the axis of each foot portion being coincident with the axis of each puller arm, f) each foot portion being generally square in cross section and sized to fit into a space between an outer ring member and a central shaft on a bearing carrier and to hook onto a flat ridge that is adjacent to the central shaft whereby when the foot portion is attached to the bearing carrier, the foot portion will secure the puller tool to the bearing carrier to prevent premature disengagement of the puller tool from the bearing carrier when the puller tool is activated to remove the bearing carrier from a housing in which the bearing carrier is mounted.

2. The bearing carrier puller tool of claim 1 wherein the central body member includes a recessed end portion adapted to receive an end of the propeller drive shaft whereby the bearing carrier puller tool can be positioned on the propeller drive shaft.

3. The bearing carrier puller tool of claim 1 wherein the puller bolt is provided with a polygonal cross section at one end thereof whereby a wrench can be applied to the puller bolt to rotate the puller bolt to remove the bearing carrier.

* * * * *